(12) United States Patent
Potter et al.

(10) Patent No.: US 10,504,270 B2
(45) Date of Patent: Dec. 10, 2019

(54) RESOURCE SYNCHRONIZATION FOR GRAPHICS PROCESSING

(71) Applicant: Apple Inc., Cupertino, CA (US)

(72) Inventors: Terence M. Potter, Austin, TX (US); Richard W. Schreyer, Scotts Valley, CA (US); James J. Ding, Santa Clara, CA (US); Alexander K. Kan, San Francisco, CA (US); Michael Imbrogno, San Jose, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 15/388,985

(22) Filed: Dec. 22, 2016

(65) Prior Publication Data

US 2018/0182154 A1    Jun. 28, 2018

(51) Int. Cl.
G06F 12/00    (2006.01)
G06T 15/00    (2011.01)

(52) U.S. Cl.
CPC ............ G06T 15/005 (2013.01); G06F 12/00 (2013.01)

(58) Field of Classification Search
CPC .............................. G06T 15/205; G06T 15/80
USPC ....................................................... 345/426
See application file for complete search history.

(56) References Cited

U.S. PATENT DOCUMENTS

| | | | |
|---|---|---|---|
| 7,103,720 B1 | 9/2006 | Moy et al. | |
| 7,548,238 B2 | 6/2009 | Berteig et al. | |
| 7,733,347 B2 | 6/2010 | Tarditi, Jr. et al. | |
| 7,948,498 B1 | 5/2011 | Minkin | |
| 7,973,803 B1 | 7/2011 | Miller et al. | |
| 8,040,351 B1 | 10/2011 | Diard | |
| 8,195,882 B2 | 6/2012 | DeLaurier et al. | |
| 8,379,024 B2 | 2/2013 | Novosad et al. | |
| 8,553,040 B2 | 10/2013 | Sevigny et al. | |
| 9,183,609 B2 | 11/2015 | Bastos et al. | |
| 2011/0074802 A1 | 3/2011 | Nickolls et al. | |
| 2011/0078417 A1* | 3/2011 | Fahs ................... | G06F 9/30145 712/216 |
| 2012/0096474 A1* | 4/2012 | Jiao ......................... | G06F 9/485 718/107 |
| 2013/0311999 A1* | 11/2013 | Fetterman ............. | G06F 9/5011 718/104 |
| 2014/0176579 A1 | 6/2014 | Duluk, Jr. et al. | |

(Continued)

OTHER PUBLICATIONS

Kshitij Gupta, et al., "A Study of Persistent Threads Style GPU Programming for GPGPU Workloads," Innovative Parallel Computing (InPar), May 13-14, 2012, 14 pages.

*Primary Examiner* — Jin Ge
(74) *Attorney, Agent, or Firm* — Meyertons, Hood, Kivlin, Kowert & Goetzel, P.C.

(57) ABSTRACT

Techniques are disclosed relating to synchronizing access to pixel resources. Examples of pixel resources include color attachments, a stencil buffer, and a depth buffer. In some embodiments, hardware registers are used to track status of assigned pixel resources and pixel wait and pixel release instruction are used to synchronize access to the pixel resources. In some embodiments, other accesses to the pixel resources may occur out of program order. Relative to tracking and ordering pass groups, this weak ordering and explicit synchronization may improve performance and reduce power consumption. Disclosed techniques may also facilitate coordination between fragment rendering threads and auxiliary mid-render compute tasks.

15 Claims, 12 Drawing Sheets

Pixlock state for thread 810

Pixwait scope    Pixwait ID(s)

Underlapping Fragment Information

Stall circuitry 820

Example ID to pixel resource mapping 830:
ID0  color attachment 0
ID1  color attachment 1
ID2  color attachment 2
ID3  color attachment 3
ID4  depth and stencil buffers Example g-buffer creation code 840:
```
pixrel PRID0              //release ID0, not used
CODE_A                    // generate data for buffer
pixwait PRID4             // wait on buffer resources
movmsk                    // write to buffer resources
pixrel PRID4              // release buffer resources
CODE_B
pixwait PRID1             // wait on color attachment 1
stpix [1]                 // write to color attachment 1
pixrel PRID1              // release color attachment 1
CODE_C
pixwait PRID2|PRID3       // wait on color attachments 2 and 3
stpix [2][3]              // write to color attachments 2 and 3
end
```

Example light accumulation code 850:
```
pixrel PRID1| PRID2| PRID3| PRID4   // only writing to ID0
pixwait PRID1| PRID2| PRID3         // wait to read g-buffer
ldpix [1][2][3]                     // read g-buffer
CODE_B                              // perform light accumulation
pixwait PRID0                       // wait on color attachment 0
stpix [0]                           // store results
end
```

(56) References Cited

U.S. PATENT DOCUMENTS

| | | | |
|---|---|---|---|
| 2014/0189698 A1* | 7/2014 | Choquette | G06F 9/4881 |
| | | | 718/103 |
| 2014/0337848 A1 | 11/2014 | Llamas et al. | |
| 2014/0340389 A1 | 11/2014 | Lanman et al. | |
| 2014/0362081 A1* | 12/2014 | Cerny | G06T 15/005 |
| | | | 345/426 |
| 2015/0378920 A1 | 12/2015 | Gierach et al. | |
| 2016/0055610 A1* | 2/2016 | Kenney | G06T 1/20 |
| | | | 345/522 |
| 2016/0078671 A1 | 3/2016 | Olsen et al. | |
| 2016/0093069 A1 | 3/2016 | Maiyuran et al. | |
| 2016/0284119 A1* | 9/2016 | Surti | G06T 15/005 |
| 2016/0358307 A1* | 12/2016 | Brothers | G06T 15/005 |
| 2017/0207931 A1 | 7/2017 | Gul et al. | |

* cited by examiner

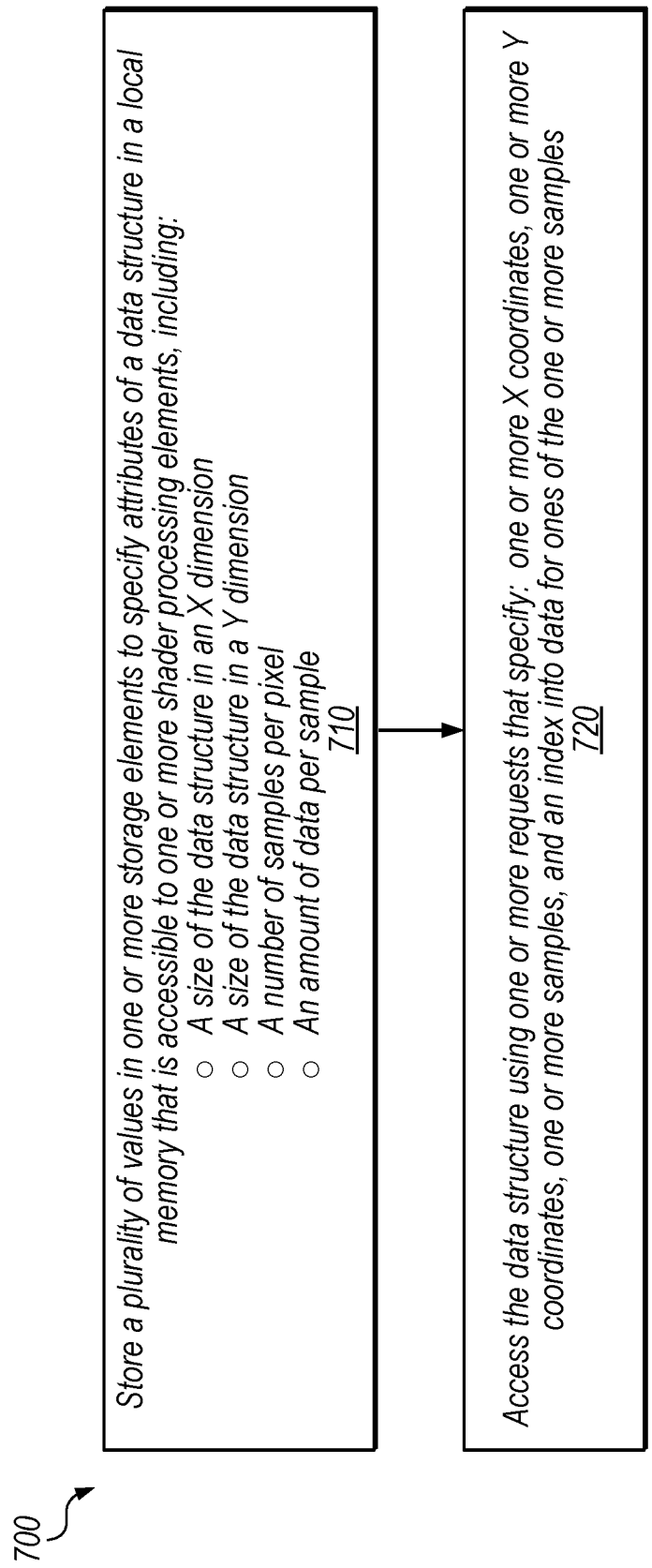

Store a plurality of values in one or more storage elements to specify attributes of a data structure in a local memory that is accessible to one or more shader processing elements, including:
- A size of the data structure in an X dimension
- A size of the data structure in a Y dimension
- A number of samples per pixel
- An amount of data per sample

710

Access the data structure using one or more requests that specify: one or more X coordinates, one or more Y coordinates, one or more samples, and an index into data for ones of the one or more samples

Example g-buffer creation code 840:
```
pixrel PRID0         //release ID0, not used
CODE_A               // generate data for buffer
pixwait PRID4        // wait on buffer resources
movmsk               // write to buffer resources
pixrel PRID4         // release buffer resources
CODE_B
pixwait PRID1        // wait on color attachment 1
stpix [1]            // write to color attachment 1
pixrel PRID1         // release color attachment 1
CODE_C
pixwait PRID2|PRID3  // wait on color attachments 2 and 3
stpix [2][3]         // write to color attachments 2 and 3
end
```

Example light accumulation code 850:
```
pixrel PRID1| PRID2| PRID3| PRID4   // only writing to ID0
pixwait PRID1| PRID2| PRID3         // wait to read g-buffer
ldpix [1][2][3]                      // read g-buffer
CODE_B                               // perform light accumulation
pixwait PRID0                        // wait on color attachment 0
stpix [0]                            // store results
end
```

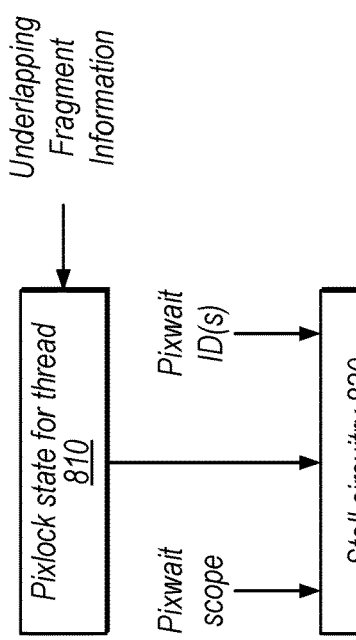

Example ID to pixel resource mapping 830:
- ID0    color attachment 0
- ID1    color attachment 1
- ID2    color attachment 2
- ID3    color attachment 3
- ID4    depth and stencil buffers

FIG. 8

RESOURCE SYNCHRONIZATION FOR GRAPHICS PROCESSING

BACKGROUND

Technical Field

This disclosure relates generally to graphics processors and more specifically to programmable shader architecture.

Description of the Related Art

Graphics processing often involves executing the same instruction in parallel for different graphics elements (e.g., pixels or vertices). Further, the same group of graphics instructions is often executed multiple times (e.g., to perform a particular function for different graphics elements or for the same graphics elements at different times). Graphics processors (GPUs) are often included in mobile devices such as cellular phones, wearable devices, etc., where power consumption and processor area are important design concerns.

Graphics units typically utilize memory hierarchies with caches and local memories dedicated to particular processing elements and higher-level caches and memories that are shared among multiple processing elements. Further, some memories (such as system memory) may be shared with non-graphics processing elements such as a central processing unit (CPU). Some graphics architectures allow out-of-order memory accesses to occur and may cache data at various different levels in shared or local caches. Hardware to enforce memory consistency in these architectures may consume considerable power and may restrict performance.

Speaking generally, graphics work may be conceptually divided into three types: vector tasks, pixel tasks, and compute tasks. Vertex processing involves the use of polygons to represent images, where vectors define the polygons. The output of vertex shading is typically rasterized to generate fragment information which is operated on by pixel/fragment shaders to generate pixel data for output to a display. Compute processing involves other auxiliary tasks such as generating light lists, generating mipmaps (or other reduction algorithms), etc.

Typically, a graphics render pass (e.g., for pixel shader threads producing pixel data) is performed by a shader core using its local memory. Once the render is done, the results are written to device memory and available to other cores or processing elements. Therefore, compute tasks are traditionally performed between renders, using data in the device memory. Said another way, device memory is traditionally used to share data between compute tasks and pixel rendering tasks. Access to device memory may be a bottleneck in GPU designs, however, and may consume substantial power.

GPUs are typically expected to perform fragment/pixel operations in a particular order (in the order the operations were submitted to the GPU by a graphics program). Some GPUs are configured to generate "pass groups" of fragments, among which the order of operations do not matter (e.g., fragments in a given pass group typically did not overlap in screen space, so the order of operations within the group would not affect each other). Pass groups are traditionally ordered such that older pass groups completed before execution of younger pass groups. Enforcing pass group ordering may be a performance bottleneck and may consume significant power.

SUMMARY

Techniques are disclosed for maintaining memory consistency in graphics architectures with relaxed memory access ordering, according to some embodiments. In some embodiments, these techniques are used in memory hierarchies with at least one split cache level (e.g., split between image and buffer data). In some embodiments, memory consistency and ordering is not relaxed unless explicitly specified using software instructions. This may shift responsibility for consistency to the compiler or developer, which may increase GPU performance and/or reduce power consumption. Various operations, fences, and barrier operations may specify memory attributes such as acquire, release, or sequentially consistent and may also specify a scope for enforcement of the attributes. The attributes may be enforced at different levels in the memory hierarchy depending on the specified scope.

In some embodiments, compute tasks are performed mid-render, without accessing shared memory. This may reduce memory traffic (e.g., shared memory is traditionally used to share data between compute kernels and render passes) and the compute tasks may be able to share data with fragment shaders using local memory.

In some embodiments, hardware registers are configurable to specify dimensions of a flexible local image block data structure in local memory. Exemplary dimensions that may be configurable include X and Y dimensions, a number of samples per pixel, and an amount of data per sample. The local image block data structure may facilitate mid-render compute tasks, in some embodiments. For example, a local image block may be declared by a compute kernel and accessed by a render pass, or vice versa.

In some embodiments, a graphics unit is configured to synchronize access to pixel resources based on explicit software controls. In these embodiments, the graphics unit may not be configured to enforce draw ordering or API submission ordering implicitly. Rather pixel resources may be accessed out of order unless explicitly synchronized. The graphics unit may be configured to execute wait and release instructions to synchronize access to pixel resources, such as color attachments, a depth buffer, etc. Pixel resources may be mapped to identifiers (e.g., by a graphics driver), and a hardware register for a thread may maintain state information for each identifier. These synchronization techniques may facilitate mid-render compute (e.g., they may be particularly useful in coordinating access to local image block data, for example, because compute tasks may be tile-scoped while fragment shaders are pixel-scoped). These synchronization techniques may also reduce power consumption and increase performance.

BRIEF DESCRIPTION OF THE DRAWINGS

FIG. 7 is a flow diagram illustrating an exemplary method for using a local image block, according to some embodiments.

FIG. 8 is a diagram illustrating exemplary pixel resources synchronization circuitry and code, according to some embodiments.

Figure 1A:
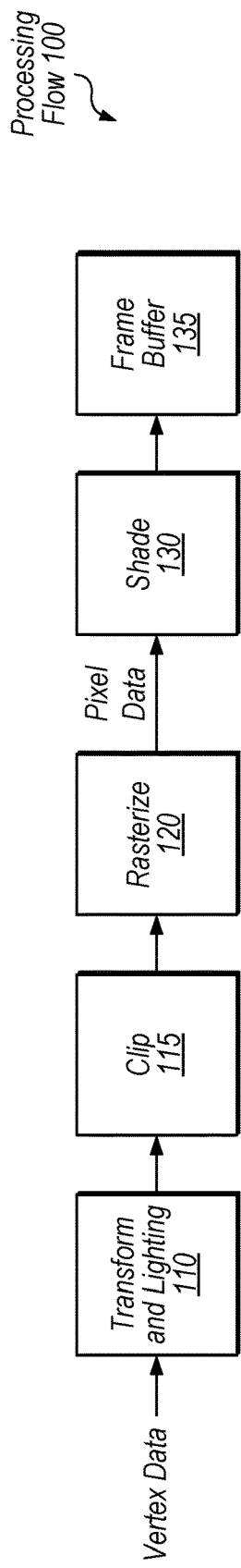
FIG. 1A is a block diagram illustrating an exemplary graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 1B:
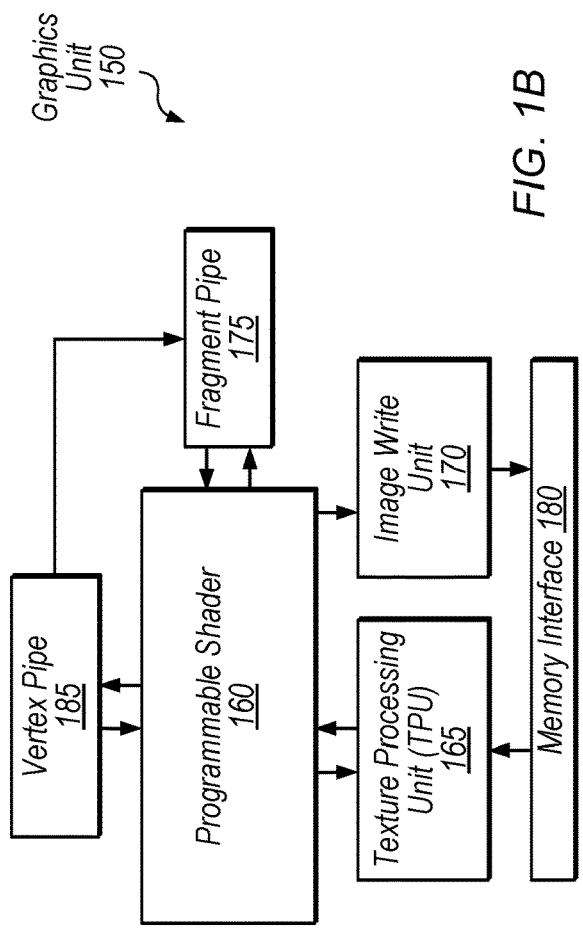
FIG. 1B is a block diagram illustrating one embodiment of a graphics unit.
Figure 10:
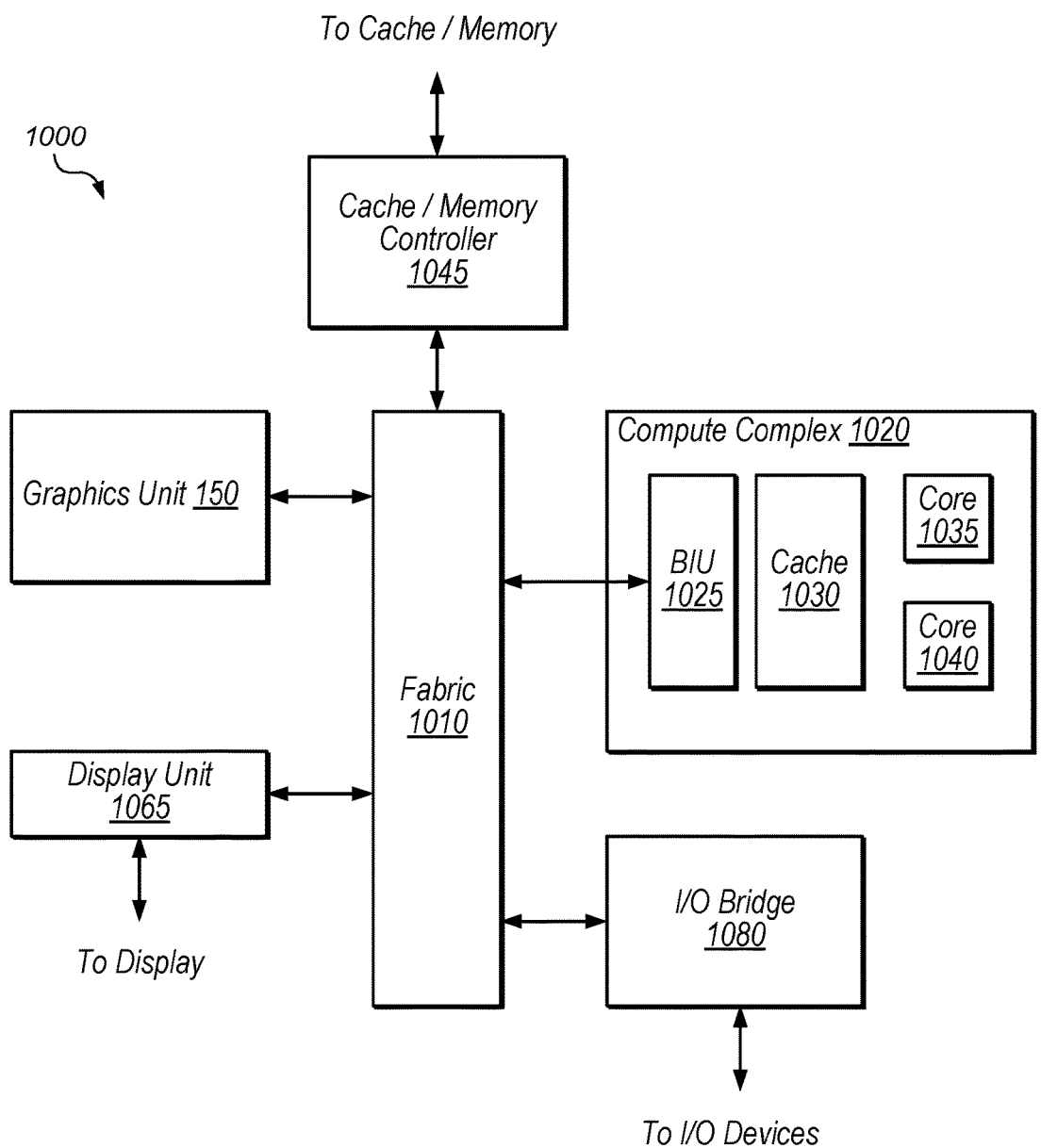
FIG. 10 is a block diagram illustrating one embodiment of a device that includes a graphics unit.
Figure 11:
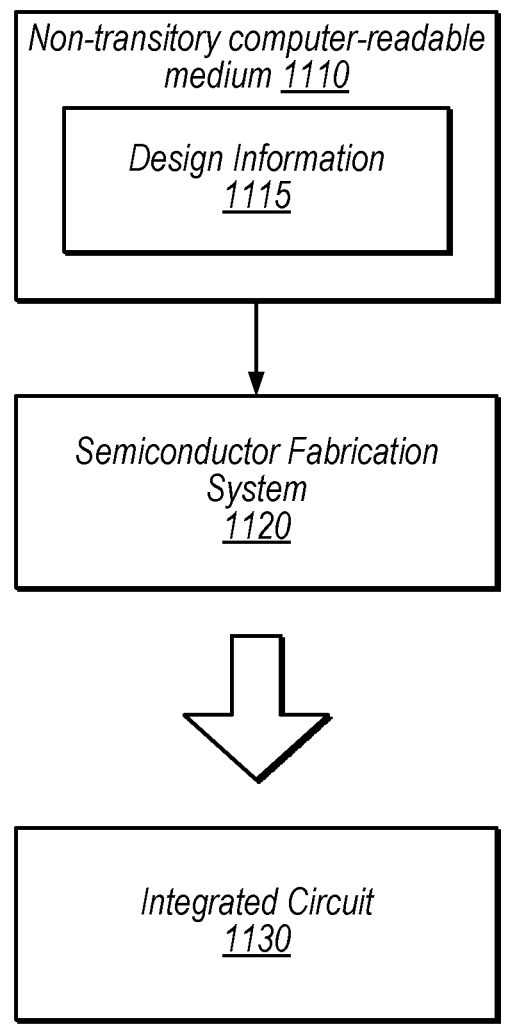
FIG. 11 is a block diagram illustrating an exemplary computer-readable medium, according to some embodiments.

This disclosure initially describes, with reference to FIGS. 1A-1B, an overview of a graphics processing flow and an exemplary graphics unit. An exemplary graphics memory hierarchy and techniques for maintaining memory consistency are discussed with reference to FIGS. 2-3. Mid-render compute techniques are discussed with reference to FIGS. 4A-5. Local image block data structures and supporting hardware are discussed with reference to FIGS. 6-7. Synchronization of pixel resources is discussed with reference to FIGS. 8-9. FIG. 10 illustrates an exemplary device and FIG. 11 illustrates an exemplary computer-readable medium. Various disclosed embodiments may improve graphics performance and reduce power consumption, relative to traditional techniques.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary Memory Hierarchy

Figure 2:
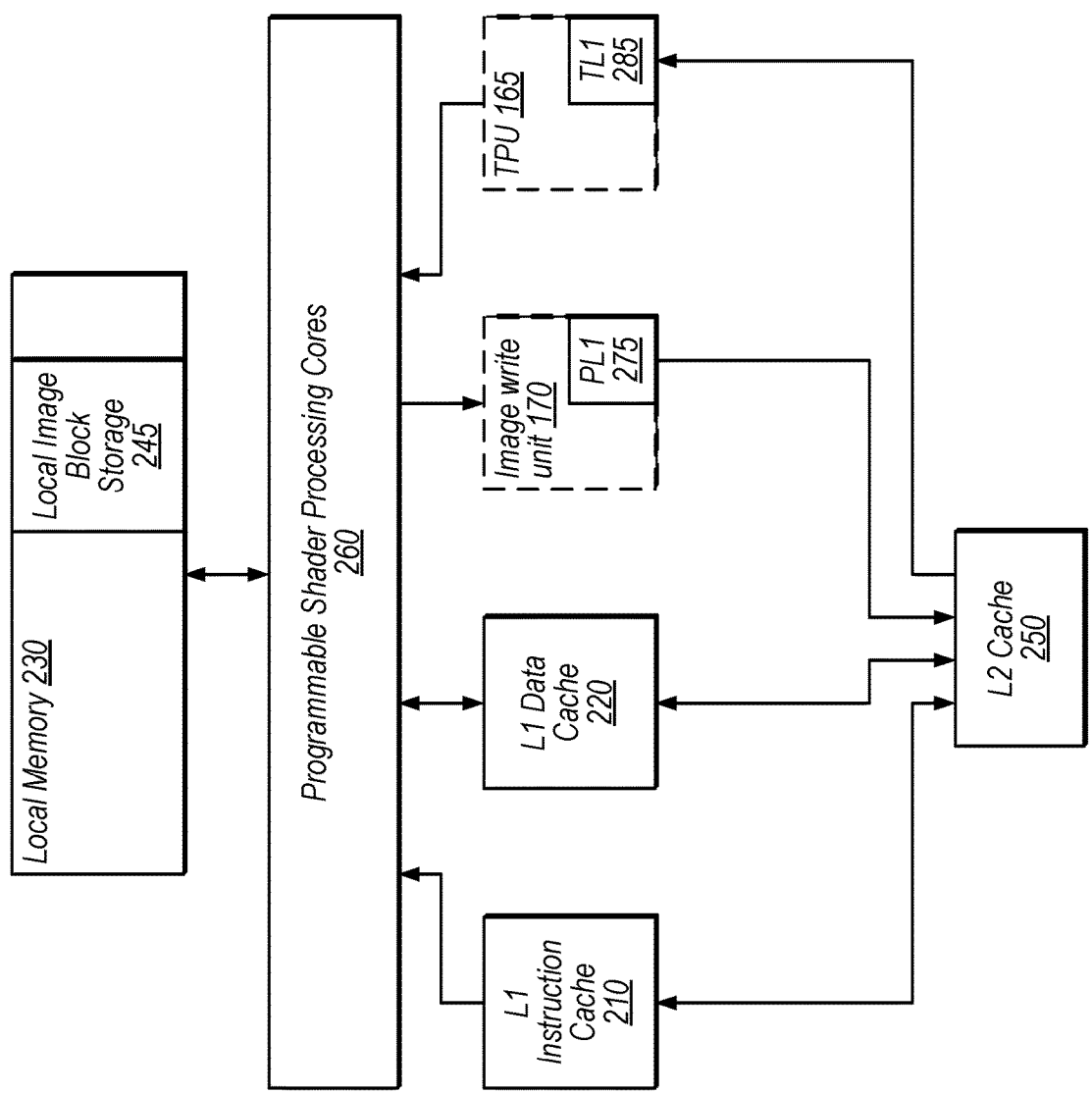
FIG. 2 is a block diagram illustrating an exemplary memory hierarchy, according to some embodiments.

FIG. 2 is a block diagram showing an exemplary memory hierarchy, according to some embodiments. In the illustrated embodiment, graphics unit 150 includes local memory 230, programmable shader processing cores 260, L1 instruction cache 210, L1 data cache 220, an IWU cache PL1 275 (in IWU 170), a TPU L1 cache TL1 285 (in TPU 165), and L2 cache 250. As shown, the L1 caches are split in some embodiments.

Local memory 230, in some embodiments, is implemented as dedicated random access memory (RAM) in USC 160 and is disjoint from global memory. In some embodiments, local memory is used to implement local image block (LIB) storage 245 and threadgroup-scoped memory while global memory is used to implement private memory, device memory, and system memory. These different memory spaces will be discussed in further detail below. In some embodiments, the different memory spaces are supported by an application programming interface (API). In the illustrated embodiment, the L1 caches 210, 220, 275, and 285 and L2 cache 250 are included in the global memory implementation. In the illustrated embodiment, there are multiple paths in global memory depending on whether the access is to a buffer, an image read, or an image write (e.g., image reads may be handled by TPU 165 through TL1 285 and image writes may be handled by IWU 170 through PL1 275).

In the illustrated embodiment, local image block storage 245 is a memory space included in local memory 230. The local image block memory space may or may not be considered as included in the local memory space, however, in various embodiments. In some embodiments, local memory 230 is an on-chip memory that is included on the same integrated circuit as programmable shader processing cores 260.

TPU 165 and IWU 170 may be described as coprocessors and their respective L1 caches may be used to store only image data (e.g., textures, processed tiles, etc.). Speaking generally, TPU 165 may be used to read image data and IWU to write image data. Therefore, TPU L1 cache 285 may be a read-only cache, in some embodiments. In the illustrated embodiment, the L1 cache level for data is split between the L1 data cache 220, the IWU L1 (PL1) cache 275, and the TPU L1 (TL1) cache 285, which are distinct caches. Therefore, to achieve memory consistency between the L1 caches 220, 275, and 285, L2 cache 250 is the coherence point, in the illustrated embodiment. In some embodiments, TPU 165 and/or IWU 170 are configured to execute certain instructions in a graphics program rather than shader processing cores 260. In some embodiments, execution of graphics instructions by shader processing cores 260 may cause commands to be sent to these units rather than these units actually executing graphics instructions.

L1 data cache 220, in some embodiments, is a write-back cache such that results are not written to L2 cache 250 until about to be modified or replaced with new data. In other embodiments, L1 cache may implement other caching schemes, such as write-through, etc. with any of various write-miss policies. L2 cache 250, in some embodiments, is available to processing elements across graphics unit 150. In some embodiments, one or more lower level caches than the L1 caches may be implemented for use by shader processing elements.

In some embodiments, the hardware architecture supports three hardware memory spaces (local, global, and instruction) while the API provides pointer types for private, LIB, threadgroup, device, system memory, and debug pointers, which may be converted to the hardware memory spaces.

Local memory 230, in some embodiments, is a physical memory implementation of an API-defined threadgroup memory space and is accessible to compute kernel and fragment processing tasks (e.g., from a compute data master scheduler and a pixel data master scheduler respectively) and may not be accessible for other tasks such as vertex processing. All work items within a thread group (a group of threads assigned to the same shader processing element(s) and scheduled to share a memory context) see the same allocation in local memory. In some embodiments, for fragment processing, local memory is tile-scoped such that all threads corresponding to a tile see the same local memory allocation. As discussed in further detail below, these threads may include fragment threads and mid-render compute threads. Note that threads may also be assigned to the same single-instruction multiple data (SIMD) group, which may include a portion of the threads in a thread group, where threads in the SIMD group execute the same instructions (other than instructions that are predicated off, in embodiments with predicated execution) and are scheduled to execute in parallel using parallel hardware. The number of threads assigned to SIMD groups may vary, in different embodiments.

In some embodiments, local memory 230 is accessed using a virtual address that includes a local memory allocation identifier. This virtual address may be converted to a physical address by programmable shader 160. A local memory allocation may be persistent until completion of all threads associated with the particular threadgroup or tile. In some embodiments local memory 230 is used for two API-supported memory spaces: threadgroup memory (which is accessed via loads and stores) and image block memory (which is accessed via local image block reads and writes, which are discussed in further detail below with reference to FIG. 6).

Global memory, in some embodiments, supports global buffer loads and stores (including stack accesses to private and debug memory), global images reads and writes (including texture sample operations), and instruction fetches. Global buffer accesses may treat global memory as byte-addressable and may be weakly ordered (such that from a single thread, accesses appear to have occurred in program-order but there is no guarantee of memory ordering between different threads). Additional techniques for explicitly specifying ordering, to achieve memory consistency, are discussed below. Global images accesses may not be ordered even within the same thread unless fencing instructions are used (as discussed in further detail below).

In the illustrated embodiment, there are four different paths from a shader core to global memory:
1) Through the L1 data cache 220 for buffer loads and stores
2) Through the TPU 165 for image reads and texture sample operations
3) Through the IWU 170 for image writes
4) Through the L1 instruction cache 210 for instruction accesses In the illustrated embodiment, these different paths all converge in the L2 cache 250. In some embodiments, the L1-level caches are tagged with an ID of the corresponding data master (pixel, vertex, or compute), which is mapped to a full context ID. In these embodiments, when a mapping between a context ID and a data master is changed, the L1 caches may be flushed/invalidated.

In some embodiments, instructions may include fields to specify caching behavior. These fields may be referred to as cache control fields, and may be included in memory access instructions and associated with cache lines. Examples of behavior that may be specified by such cache controls include: (a) store in an L1 cache and store in L2 cache 250, (b) read-through/write-through flush invalidate L1 cache, store in L2 cache 250, and (c) read-through/write-through flush invalidate both L1 cache and L2 cache 250C. In some embodiments, each physical cache line may be marked as containing cache data (clean or dirty) or read-through/write-through (RTI/WTI) data. The RTI/WTI modes may allow the caches to be used as buffers to store data until a synchronization instruction encountered, at which point the read-through data or the write-through data is invalidated from cash or flushed from cache, respectively. Traditional flush operations, however, may not affect WTI/RTI data. For a cache control field, a cacL1_cacL2 value may indicate to store in both L1 cache and L2 cache, a bypL1_cacL2 value may indicate to store in L2 and read-through/write-though flush invalidate L1, and a bypL1_bypL2 value may indicate to read-through/write-through flush invalidate both L1 and L2. The cache control field may encode these three values using two bits, in some embodiments. In other embodiments, greater numbers of bits may be used to track additional states, e.g., for greater numbers of levels in a cache hierarchy.

Various instructions may operate on cache lines differently based on their cache control fields. In some embodiments, flush and invalidate instructions impact lines in L1 caches that are marked as cached and not those that are marked as RTI or WTI (e.g., as indicated by the "byp" label). In some embodiments, a buffer-data cache flush (bdcf) instruction flushes data out of L1 data cache 220. In some embodiments, a buffer-data cache invalidate clean (bdcic) invalidates and cleans the L1 data cache 220. In some embodiments, an image-data cache flush (idcf) instruction flushes data from IWU L1 cache 275. In some embodiments, an image-data cache invalidate clean operations invalidates cached data in the TPU L1 cache 285 (in some embodiments, this is a read-only cache that cannot hold dirty data, so this operation is simply an invalidate).

For example, a bdcf instruction that follows a store executed with cacL1_cacL2 would cause the store data to be flushed from L1 to L2, in some embodiments. On the other hand, a bdcf instruction that follows a store executed with bypL1_cacL2 would not impact the store data, even if the data exists in the L1 cache as WTI data, in these embodiments. Instead, the store data may be accessed using a syncbuf I2c.release instruction (discussed in further detail below) which would force pending L2-targeted store data to be ordered in the L2 cache (by writing the store data from L1 to L2).

This is one mechanism by which RTI and WTI techniques may allow the L1 caches to be used as buffers, where data is stored in the cache until a synchronization operation, but not considered to be in a normal cached state. This may reduce memory traffic, in some embodiments, by grouping writes to a higher level in the memory hierarchy rather than spreading them out over time.

In some embodiments, instructions may specify whether or not data should be allocated with low persistence in L2 cache 250 (and/or other caches). This may allow data to be flagged for replacement when it is known (e.g., as specified by the compiler) that it will not be used in the near future. In some embodiments, a persistence field is implemented using a single bit that indicates high or low persistence.

System memory space, in some embodiments, is implemented on top of global memory and the address spaces are aligned so that conversion of a system memory pointer into a global memory pointer can be performed using an identity mapping. In some embodiments, system memory allows graphics unit 150 to share data with other processing devices in a system, at a kick granularity. In some embodiments, firmware for graphics unit 150 facilitates sequencing of such sharing.

Device memory space, in some embodiments, is also implemented on top of global memory. In some embodiments, the address spaces for device memory and global memory are exactly aligned. In some embodiments, device memory is accessible to all threads executing on graphics shaders. Therefore, in some embodiments, L2 cache 250 is the coherency point for device memory (which is the lowest level where all memory access paths come together to a common point in the memory hierarchy, in the embodiment of FIG. 2). In some embodiments, system memory is also available to other non-GPU processing elements such as a CPU. Therefore, system memory may be the coherence point for the GPU and CPU.

Thread address space, in some embodiments, includes private instance-stack memory and debug memory. These spaces may be mapped to contiguous chunks of global memory provided by a GPU driver and specified via hardware registers (e.g., using a base address and a size).

Exemplary Memory Synchronization and Consistency

In some embodiments, syncbuf and syncing instructions allow synchronization of buffer operations and image operations respectively. In some embodiments, these instructions include fields that specify (a) a target (e.g., L1 cache, L2 cache, or device memory) and (b) whether the synchronization instruction is acquiring and/or releasing memory side-effects. These operations may specify that all prior stores targeted at the specific level of the memory hierarchy have been ordered at that level of the hierarchy ahead of any following loads or stores targeting that level. L1 cache flush operations may be considered as stores that target the next cache level. In this case, ordering is relative to program order for a single thread. Therefore, the synchronization instructions may not enforce a global order among threads, unless used in conjunction with barrier operations, for example, to identify a global order (barrier instructions are discussed in further detail below). In some embodiments, in order to completely synchronize all loads or stores, a synchronization instruction for each level of the hierarchy (e.g., L1, L2, and device levels, in disclosed embodiments) may be required.

In some embodiments, there multiple different memory attributes that can be applied to atomic operations or used as fence operations. In some embodiments, these attributes may trigger appropriate synchronization instructions. Examples of these attributes include: relaxed, acquire, release, acq_rel, and seq_cst. These flags may be referred to using the syntax "memory_order" in the API, e.g., as in "memory_order_relaxed." Memory_order_relaxed, in some embodiments, implies no order constraints. Memory_order_acquire, in some embodiments, acquires side-effects (e.g., from stores) from an operation with a release attribute (discussed below) that synchronizes with the acquire. Thus, if an acquire synchronizes with a release, the acquiring unit of execution will see all side effects preceding the release (and possibly subsequent side-effects). Memory_order_release, in some embodiments, releases side effects to an operation with an acquire attribute and all side effects that precede the release are included in the release. Thus, a release attribute may generally be used to synchronize prior stores and an acquire attribute may be generally used to synchronize subsequent loads. Memory_order_acq_release, in some embodiments, has both acquire and release attributes for an operation. Memory_order_seq_cst, in some embodiments, means that the loads and stores of each unit of execute appear to execute in program order, while the loads and stores from different units of execution appear to be simply interleaved. Said another way, sequentially consistent ordering imposes a single total modification order of all atomic operations that are so tagged. This means that as soon as an operation that does not use sequentially consistent memory ordering enters the picture, then sequential consistency may be lost. Sequential ordering may be used for multiple-producer/multiple-consumer situations where consumers should observe the actions of all producers occurring in the same order. In some embodiments, other threads accessing a variable (e.g., other than the threads with a particular acquire and release pair) may see a different order of memory accesses. Said another way, memory consistency and ordering may not be maintained for threads that do not explicitly specify attributes such as those discussed above.

In some embodiments, a memory scope may also be specified for the memory attributes discussed above. Example values of the scope parameter may include thread, threadgroup, and device. Memory_scope_thread, in some embodiments, applies memory ordering constraints within the thread (this may be for texture fences only, in some embodiments). Memory_scope_threadgroup, in some embodiments, applies memory ordering constraints to threads executing within a threadgroup. The threadgroup scope may be enforced at L1 data cache 220, in some embodiments, because L1 data cache 220 is shared among the shader processing cores 260, ones of which may execute different threads of a threadgroup. Memory_scope_device, in some embodiments, applies memory ordering constraints to all threads executing on a device, which may include threads performed by TPU 165, IWU 170, etc. Therefore, the device scope may be enforced at L2 cache 250, in some embodiments. The memory scope attributes may be implemented using a combination of synchronization instructions and cache controls applied to memory operations. These attributes may also be implemented for fence operations, in some embodiments, which may impose ordering between all atomic and non-atomic operations across the fence (at the specified scope).

For example, the following Table 1 sets out examples of implementation of different scopes and memory ordering attributes using cache controls and synchronization instructions. In particular, Table 1 includes expansions for atomic-with-return operations to global memory (with device-scoped variables):

TABLE 1 expansions for atomic-with-return operations
to global memory (device-scoped variables

| Scope | Ordering | Expansion |
|---|---|---|
| threadgroup | relaxed | atomic.gm.OP . . . cacL1_cacL2 |
|  | release | syncbuf l1c.release |
|  |  | atomic.gm.OP . . . cacL1_cacL2 |
|  | acquire | atomic.gm.OP . . . cacL1_cacL2 |
|  |  | syncbuf l1c.acquire |
|  | acq_rel | syncbuf l1c.release |
|  | seq_cst | atomic.gm.OP . . . cacL1_cacL2 |
|  |  | syncbuf l1c.acquire |
| device | relaxed | atomic.gm.OP . . . bypL1_cacL2 |
|  | release | syncbuf l2c.release |
|  |  | atomic.gm.OP . . . bypL1_cacL2 |
|  | acquire | atomic.gm.OP . . . bypL1_cacL2 |
|  |  | syncbuf l2c.acquire |
|  | acq_rel | syncbuf l2c.release |
|  | seq_cst | atomic.gm.OP . . . bypL1_cacL2 |
|  |  | syncbuf l2c.acquire |

In table 1, "gm" refers to global memory (where "lm" refers to local memory, e.g. for threadgroup-scoped variables). As shown in table 1, synchronization instructions are used at different scopes to enforce consistency at the threadgroup level or the device level. In the example of Table 1, device-scoped synchronization occurs at L2 cache 250 while threadgroup-scoped synchronization occurs at L1 data cache 220. Further, the device-scoped expansions use write-through cache controls for L1 data cache 220 while the threadgroup-scoped expansions do not. Note that threadgroup-scoped operations may not require synchronization operations but may be merely implemented as atomic.l-m.OP, for example.

In some embodiments, atomic operations without return may have only a subset of the ordering semantics. In particular, because these operations do not provide load functionality, they may not have acquire semantics. Therefore, acq_rel and seq_cst may degenerate to release ordering for these operations.

In some embodiments, similar attributes may be used to specify the ordering to be applied across a barrier. In some embodiments, "barrier" operations allow execution synchronization, e.g., of multiple threads in a thread group that need to be synchronized to the same location in a code stream (e.g., threads that have already reached the barrier may be stalled until other threads catch up). In some embodiments, "fence" operations are used to enforce a relationship between memory operations before the fence and after the fence (e.g., all stores before the fence must be visible to loads after the fence for some fence operations) but may not synchronize the instruction stream.

Therefore, in some exemplary embodiments, the following attributes are available for barriers that include fencing: mem_none; mem_device; mem_threadgroup; mem_threadgroup_imageblock; and mem_texture. Mem_none, in some embodiments specifies that there is no memory fencing provided by the operation. Mem_device, in some embodiments, specifies that all memory_scope_device buffer loads and stores are ordered across the barrier. Mem_threadgroup, in some embodiments, specifies that all memory_scope_threadgroup buffer loads and stores are ordered across the barrier. Mem_threadgroup_imageblock, in some embodiments, specifies that all memory_scope_threadgroup local image block loads and stores are ordered across the barrier. Mem_texture, in some embodiments, specifies that all memory_scope_device and memory_scope_threadgroup image loads and stores are ordered across the barrier.

For barrier operations, both a barrier scope for code synchronization and a memory ordering attribute may be specified. Table 2 sets out exemplary expansions for different barrier scopes and memory ordering attributes. Multiple flags may be used with a given barrier instruction and the attributes may be additive.

In some embodiments, a threadgroup-scoped barrier means that all threads in a threadgroup must execute the threadgroup-scoped barrier before any thread is allowed to continue execution beyond the barrier. Similarly, a SIMD-group scoped barrier, in some embodiments, means that all threads in a SIMD group must execute the SIMD-group scoped barrier before any thread is allowed to continue execution beyond the barrier. Various memory sequencing functionality described herein with reference to barriers may be implemented using non-barrier fence operations, e.g., without the code synchronization of a barrier.

TABLE 2 expansions for barrier operations

| Barrier Scope | Flag | Accesses cached in L2 | Accesses cached in L1 |
|---|---|---|---|
| Threadgroup, memory_scope_threadgroup | mem_device | syncbuf l1c.release barrier | syncbuf l1c.release barrier |
| | mem_texture | syncimg l2c.release syncimg l2c.acquire barrier | syncimg l1c.release idcf l1c syncimg l2c.release syncimg l2c.acquire barrier |
| Simdgroup, memory_scope_threadgroup | mem_texture | syncimg l2c.release syncimg l2c.acquire barrier | idcf l1c syncimg l2c.release syncimg l2c.acquire barrier |
| Threadgroup, memory_scope_device | mem_device | syncbuf l2c.release syncbuf l2c.acquire barrier | syncbuf l1c.release bdcf l1c syncbuf l2c.release syncbuf l2c.acquire barrier |
| | mem_texture | syncimg l2c.release syncimg l2c.acquire barrier | syncimg l1c.release idcf l1c syncimg l2c.release syncimg l2c.acquire barrier |
| Simdgroup, memory_scope_device | mem_texture | syncimg l2c.release syncimg l2c.acquire barrier | idcf l1c syncimg l2c.release syncimg l2c.acquire barrier |

For example, the expansion for threadgroup_barrier (mem_device) would be syncbufl1c.realease; barrier, as shown in the first row of table 2. In some embodiments a barrier with mem_none or no flag simply emits a barrier operation. In some embodiments, if multiple memory attributes are specified for a barrier, multiple expansions from Table 2 may be implemented.

The memory attributes, scope parameters, types of operations, particular cache hierarchies, etc., are included for purposes of illustration, but are not intended to limit the scope of the present disclosure. In other embodiments, similar techniques may be used to enforce particular memory consistency and ordering characteristics in a weakly ordered graphics processor.

Exemplary Method for Memory Consistency

Figure 3:
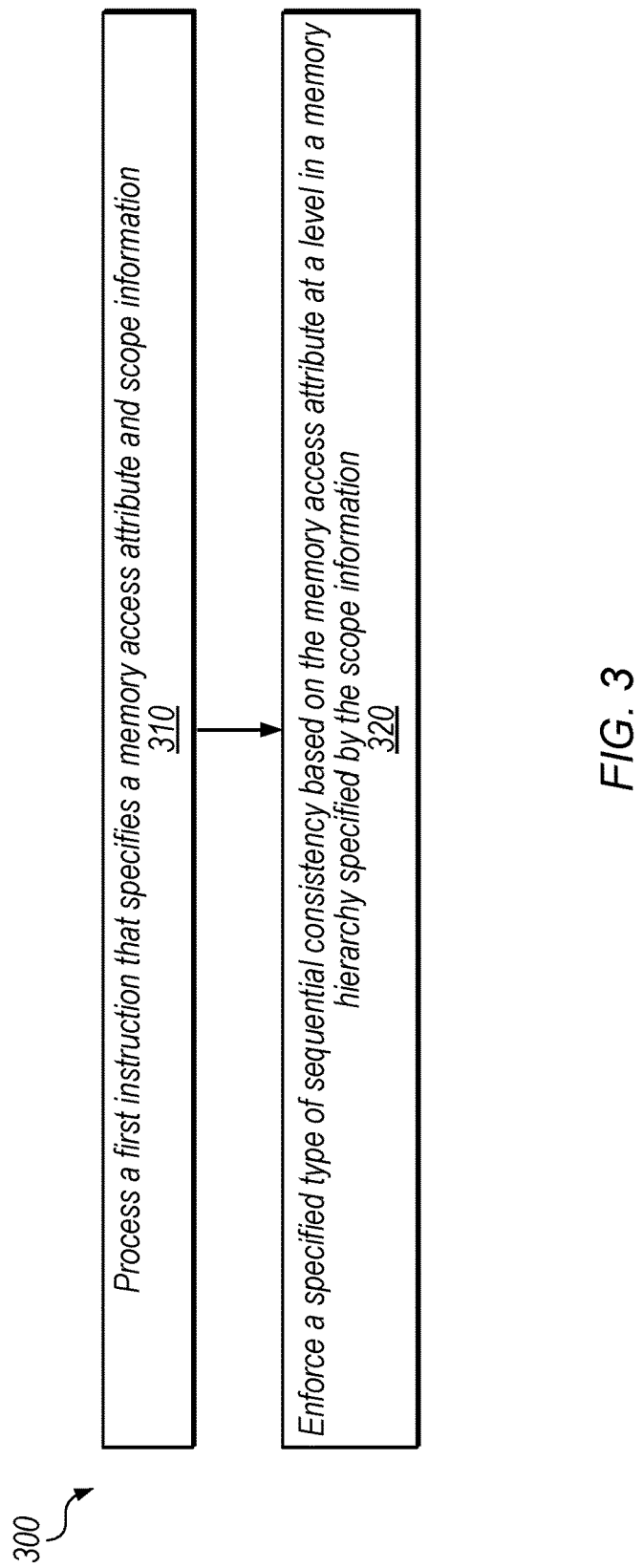
FIG. 3 is a flow diagram illustrating an exemplary method for maintaining memory consistency, according to some embodiments.

FIG. 3 is a flow diagram illustrating one exemplary embodiment of a method 300 for enforcing memory consistency, according to some embodiments. The method shown in FIG. 3 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 310.

At 310, in the illustrated embodiment, graphics unit 150 processes a first instruction that specifies a memory access attribute and scope information. In some embodiments, the memory access attribute specifies a type of sequential consistency to be enforced for an operation specified by the first instruction. As discussed above, in some embodiments the types of sequential consistency include: none, acquire, release, acquire+release, and sequentially consistent. In situations where the first instruction is a barrier operation, the memory access attribute may be implied (that loads and stores at the specified scope are ordered across the barrier). As discussed above, embodiments of scope may include thread, threadgroup, and device. For barrier operations, an additional scope of the barrier itself may also be specified.

At 320, in the illustrated embodiment, graphics unit 150 enforces a specified type of sequential consistency based on the memory access attribute at a cache level in a memory hierarchy specified by the scope information. For example, in the embodiment of FIG. 2, a "threadgroup" scope may be enforced at the L1 level while a "device" scope may be enforced at the L2 level. In some embodiments, consistency between operations with release and acquire attributes are enforced for operations with the same scope specified. For example, a first operation with a release attribute and a threadgroup scope may be synchronized with a second operation with an acquire attribute and threadgroup scope such that memory side-effects at the L1 level prior to the first operation are visible to the second operation. In some embodiments, different scopes are specified for different portions of a split level in the memory hierarchy (e.g., different scopes for image and buffer synchronization at the L1 level, in some embodiments).

Exemplary Command Buffer Execution

Figure 4A:
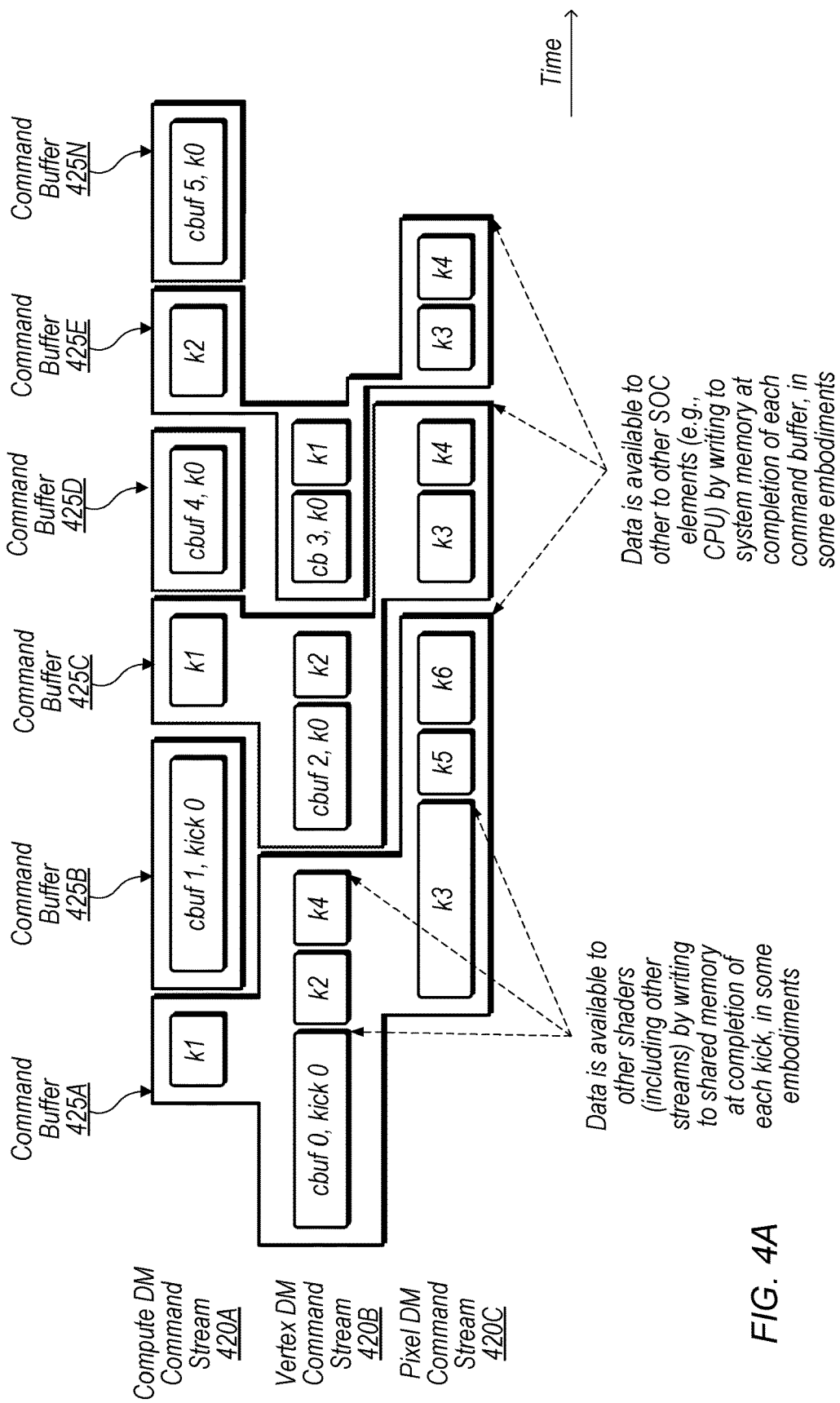
FIGS. 4A and 4B are diagrams illustrating exemplary command buffer execution, including mid-render compute, according to some embodiments.

FIG. 4A is an exemplary diagram that shows execution of graphics command buffers 425A-425N, according to some embodiments. In the illustrated embodiment, command streams 420A-420C correspond to work assigned by different data masters (a compute data master, a vertex data master, and a pixel data master). Each data master may handle scheduling of its corresponding work on portions of programmable shader 160.

In the illustrated embodiment, each command buffer 425 includes a set of one or more kicks. As shown a given command buffer may include kicks from multiple ones of the data masters 420. Further each data master may include multiple kicks in the same command buffer. For example, in the illustrated embodiment and with respect to "cbuf 0," kick "k1" and kick "k2" are executed on command stream 420A and command stream 420B respectfully, yet the two kicks are grouped in a single command buffer "cbuf0."

In some embodiments, a "kick" is an atomic unit of work from the view of other portions of programmable shader 160. Thus, in some embodiments, any data that is needed for a given kick is read from memory that is shared among multiple shader processing elements (e.g., L1 data cache 220) at the beginning of the kick and results are written back to shared memory at the end of the kick. Therefore, other hardware does not see the results of the kick until completion of the kick, at which points the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc.

In some embodiments, a flush request is issued to flush and invalidate portions or all of L2 cache 250 in response to finishing execution of each command buffer. Thus, data may be available to other processing elements such as a CPU upon completion of a command buffer. In some embodiments, a flush occurs after the last kick of a given command buffer; however, flushes may occur at other periods during the execution of a command buffer in other embodiments. Flush events may be requests from a program that includes the particular command buffer to be flushed. In addition to targeting cache lines associated with a given command buffer that completed, a flush may further cause a flush controller to flush and invalidate other cache lines based on additional information.

In some embodiments, result data is written from local memory to shared memory (e.g., to L1 data cache 220 and/or L2 cache 250) in response to finishing execution of a given kick. This may allow other shading hardware (or the same shading hardware executing another kick) to access results of the kick. These accesses to shared memory may be a performance bottleneck and may consume significant power. For example, if a compute task needs to be performed between two related pixel kicks, in some implementations, the first pixel kick must write data to shared memory to be accessed by a compute kick for the compute task, which must in turn write data to shared memory to be accessed by the second pixel kick. Therefore, in some embodiments, mid-render computer techniques allow a compute task to be performed in the context of a pixel kick without writing the shared memory, as discussed in further detail below.

Exemplary Mid-Render Compute Techniques

Figure 4B:
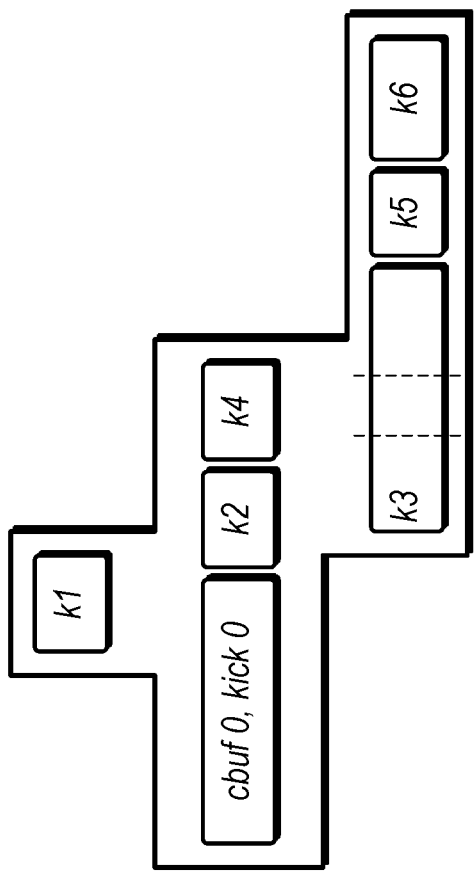

FIG. 4B is a diagram illustrating execution of a command buffer in which an auxiliary compute task is performed within the context of a pixel render kick. These compute tasks may be referred to as "tile shaders" and may be tile-scoped in some tile-based rendering embodiments. In various embodiments, this may avoid needing to flush data from fragment processing to memory to perform the auxiliary compute task, which may reduce power consumption and/or improve performance. Said another way, this may allow data for graphics processing to stay on-chip longer, in some embodiments, rather than writing off-chip before and after a compute task.

In some embodiments, the auxiliary compute task accesses data structures in the local memory space and/or the local image block space such as a tiled render target memory (e.g., pixel output registers) of the pixel render kick, a local image block of the pixel render kick, and/or other local memory structures of the pixel render kick to access or share data. As discussed above, local memory may be tile-scoped for pixel render kicks. When variables are allocated in threadgroup or threadgroup_imageblock address space for a mid-render kernel, they may allocated for each threadgroup accessing the kernel and may be persistent across functions (both mid-render compute and fragment functions) for a given tile. In some embodiments, an API (e.g., the Metal API, OpenGL, DirectX, Glide, WebGL, etc.) allows variables to be passed as arguments or declared in a particular memory space, e.g., the code "threadgroup float x;" may allocate a float in the threadgroup address space.

The kicks discussed herein are an exemplary implementation of a "render pass," which is intended to include its well-known meaning in the art, with includes a set of operations that are performed without flushing generated data to shared memory (thus, operations performed during a render pass appear atomic to other shader processing elements not performing the render pass and results of the render pass are available to other processing elements when data is written to shared memory on completion of the render pass). Therefore, various references to kicks herein may be considered references to render passes. A render pass itself may include various shader operations. A render pass may include multiple blend operations which may partially overlap, for example.

For purposes of explanation, examples of mid-render compute tasks include, without limitation: generating light lists, generating mipmaps, resolving multi-sampled image data, image statistic gathering (e.g., histograms), reducing depth bounds of an image region, etc.

Mipmapping is a well-known technique that stores a sequences of images, where each image in the sequence is a lower resolution representation of the same image relative to a prior image in the sequence. Lower-resolution mipmap levels may be used for object that appear further away in a scene. Mipmapping may be used for level-of-detail techniques, improving image quality, reducing rendering times (e.g., by reducing the number of texels sampled to render each pixel), and/or reducing load on graphics unit 150. To generate each mipmap image, graphics unit 150 may filter the higher-resolution image at the previous level to generate a lower-resolution version of the image.

Therefore, in some mid-render compute embodiments, the filtering to generate mipmap levels may be performed by auxiliary compute code executed within the context of a pixel kick, which may then utilize one or more of the mipmap levels for fragment operations subsequent to generation of the mipmap. This may allow the mipmap (for the tile being processed) to be generated in local memory and available to the fragment processing task without accessing shared memory until the pixel kick is complete.

Processing light lists is another compute task that may be performed mid-render in some embodiments. For example, a given scene may have a large light-list, but only a smaller portion of the lights may actually affect the current tile being processed. Therefore, generating a list of lights that effect the tile is an auxiliary compute task that may be performed mid-render, without accessing shared memory until completion of the render pass. The light list may then be used for fragment processing by the remainder of the kick being executed.

These examples of mid-render compute tasks are included for purposes of illustration but are not intended to limit the scope of the present embodiments. In other embodiments, any of various exemplary compute tasks may be performed in the middle of a render that includes fragment shaders. Speaking generally, the compute tasks may be executed at a higher granularity in screen space than the fragment shaders of the shader pass (e.g., in some embodiments the compute tasks are tile-scoped while the fragment shaders are fragment-scoped, with limited access to data for other pixels).

Exemplary Mid-Render Compute Method

Figure 5:
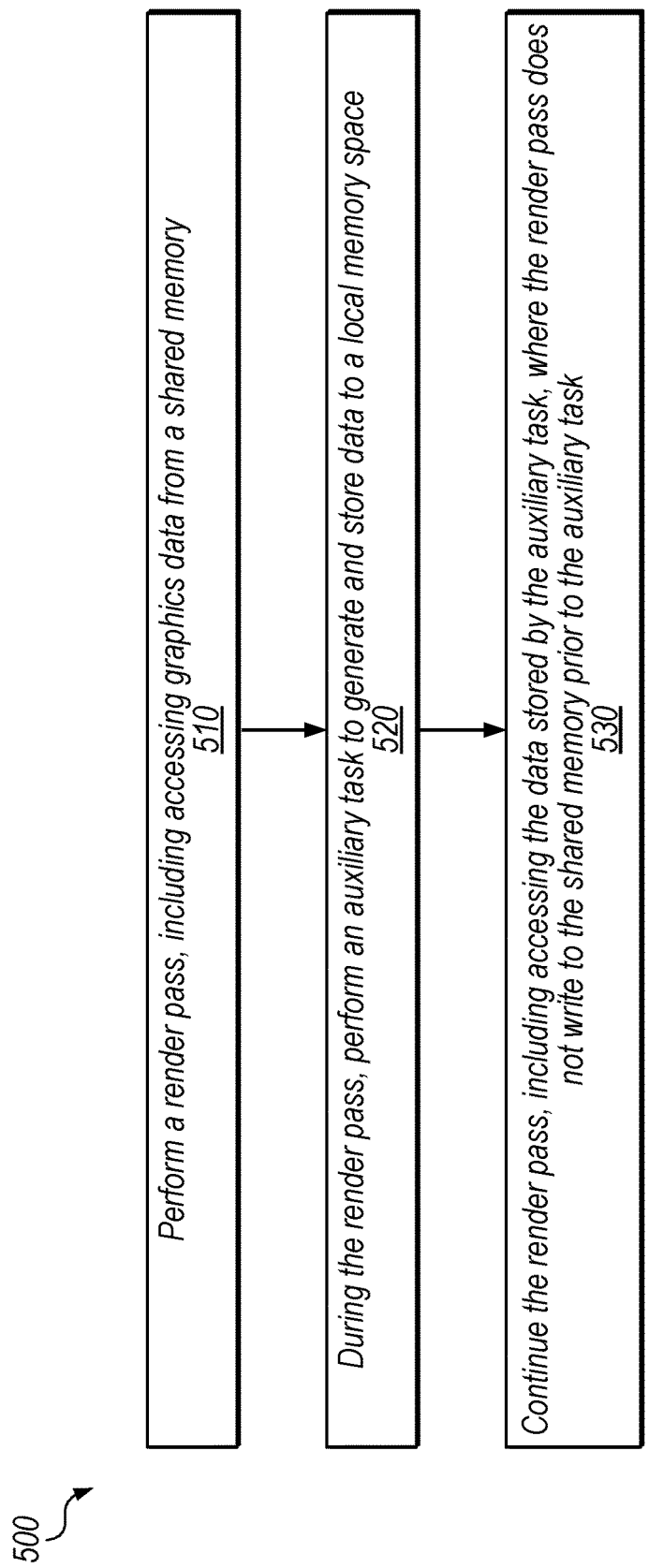
FIG. 5 is a flow diagram illustrating an exemplary method for performing mid-render auxiliary compute tasks, according to some embodiments.

FIG. 5 is a flow diagram illustrating one exemplary embodiment of a method 500 for performing a mid-render auxiliary compute task, according to some embodiments. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 510.

At 510, in the illustrated embodiment, graphics unit 150 performs a render pass, including accessing graphics data from shared memory. In some embodiments, this includes accessing data from shared memory at an initial phase of the render pass and writing results to shared memory at a final phase of the render pass, and not accessing shared memory otherwise. The accesses to shared memory may or may not be performed based on instructions in the render pass itself (e.g., other commands may be used to set up the render pass by accessing shared memory).

At 520, in the illustrated embodiment, graphics unit 150 performs an auxiliary task to generate and store data to a local memory space. In some embodiments, the auxiliary task also reads data from the local memory space (e.g., as generated by a prior portion of the render pass). In some embodiments, the local memory space is accessible to a first shader processing element performing the render pass but not to one or more other shader processing elements. In some embodiments, the auxiliary task does not access shared memory at all, although results of the auxiliary task may be written to shared memory at the end of the render pass.

At 530, in the illustrated embodiment, graphics unit 150 continues the render pass, including accessing the data stored by the auxiliary task. In the illustrated embodiment, the render pass does not write to shared memory prior to the auxiliary task (in some embodiments the render pass does not write to shared memory until completion of the render pass).

Exemplary Local Image Block Data Structure

Figure 6:
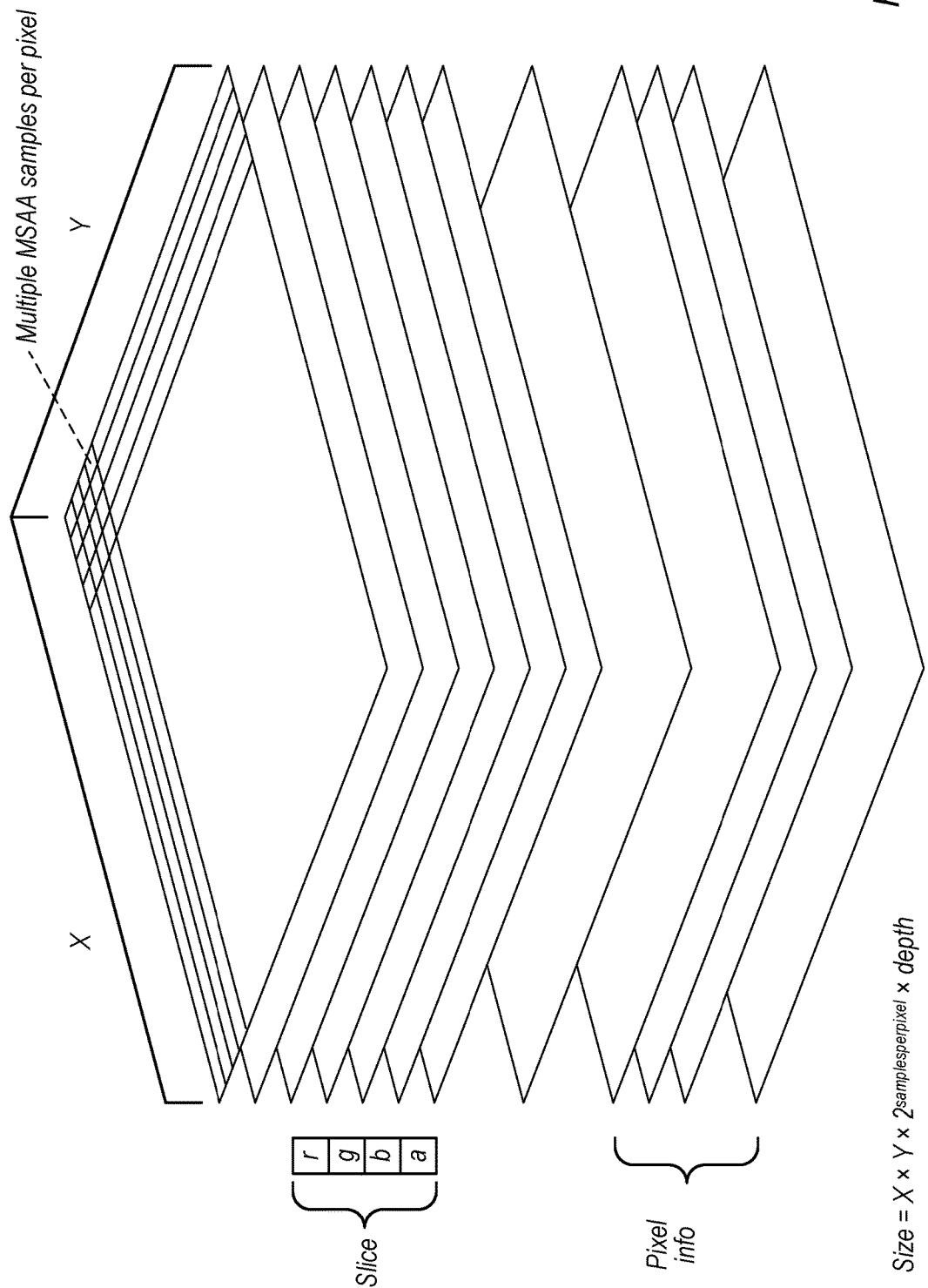
FIG. 6 is a diagram illustrating a flexible local image block data structure, according to some embodiments.

FIG. 6 illustrates an exemplary flexible data structure configured to store data in local memory 230, according to some embodiments. This type of hardware-supported structure is referred to herein as a local image block (LIB). In some embodiments, configurable aspects of the LIB data structure facilitate the mid-render compute techniques discussed above.

In the illustrated embodiment, the size of the LIB is configurable in four dimensions: an X direction (e.g., with units of pixels), a Y direction (e.g., with units of pixels), a number of samples per pixel, and a depth (an amount of data per sample). In some embodiments, shader programs include instructions to declare a LIB structure and configure its size by writing to hardware registers in graphics unit 150. Thus, in the illustrated embodiment, the size of the LIB structure in bytes is X times Y times $2^{samples\_per\_pixel}$ times depth, where depth is in units of bytes per sample. In some embodiments, LIBs are configurable in additional dimensions (e.g., a Z-dimension for three-dimensional displays such as holograms, for example).

In some tile-based embodiments, for fragment processing, the X and Y dimensions are set to correspond to the size of a tile being processed. For other tasks such as compute tasks, the X and Y dimensions may be customized for the particular task (e.g., with a greater number of entries in the X dimension than the Y dimension, or vice versa, for a line buffer task). In some embodiments, the number of samples per pixel is based on the multi-sample anti-aliasing (MSAA) mode and may range from a single sample per pixel to four samples per pixel (or more), for example. In some embodiments, storing multiple samples per pixel may also be useful for other graphics tasks in which MSAA is not used. The depth may be adjusted to store different numbers of color attachments or other pixel data for each sample. LIBs may be configured to implement a g-buffer, for example, and/or other types of buffers.

The term "slice" may be used to refer to a region in the image block that describes the values of a given element in the image block for all pixel locations (e.g., a portion of the LIB across all X, Y, and sample values).

In some embodiments, fragment functions can access LIB slices as color attachments or using an explicit layout declared in the shader. In some embodiments, explicit layout elements may use scalar, integer, or floating-point data types, or certain pixel data types.

In some embodiments, an API provides functions for compute kernels to declare local image blocks, query attributes of an existing LIB (e.g., width, height, number of samples, number of colors at a given x/y coordinate, etc.), get a reference to image block data for a specific location in the LIB, write to an LIB location, read from a region of an LIB slice (e.g., to write data from the LIB to a specified texture region), etc. In some embodiments, the API allows structures to be shared between kernel and fragment functions in order to facilitate sharing between pixel and compute functions. This may facilitate the mid-render compute functionality discussed above. In some embodiments, LIBs can be at least partially re-configured mid-render, e.g., by altering the dimensions of the LIB in one or more directions. In some embodiments, the GPU is configured to perform the reconfiguration without destroying the data in the LIB.

For mid-render mipmap generation, for example, consider a situation with a 64×64 image, a 32×32 tile, and a 32×32 LIB. In this example, the first mipmap level may be a 32×32 image and may be stored in a slice of the LIB. The remaining mipmap levels (16×16, 8×8, 4×4, 2×2, and 1) may be stored in another slice of the LIB (the size of these remaining levels converges to less than the size of the previous level, in typical mipmapping implementations).

In some embodiments, accesses to the LIB are ordered within a thread. In some embodiments, an exception is a direct memory access (DMA) operation, which may not be ordered. On example of such a DMA operation is the imgwblk instruction. This operation may copy data from the LIB to a surface in device or system memory. In the case where data being copied out of the LIB by the DMA operation is accessed by a subsequent operation (e.g., by an lstpix instruction), the write-after read operation should be protected with a fence operation, as in the following example code:

```
imgwblk
syncimg local.release
lstpix
```

Note, however, that this code sequence protects the imgwblk within a single thread. To protect from the rest of threads in a threadgroup that may be writing to the LIB structure, barrier instructions may be used, as in the following example code:

```
barrier (none)
mfsr r8 lin_id
icndst.eq r0, r8,#0, ADJ1 // if (thread_index_in_threadgroup == 0)
    imgwblk
```

```
syncimg local.release
cndend r0 ADJ1
barrier (mem_none)
lstpix
```

Therefore, the memory consistency techniques discussed above may also be applicable when writing to shared memory from the LIB memory space.

Exemplary LIB Access Method

FIG. 7 is a flow diagram illustrating one exemplary embodiment of a method 700 for using a flexible local image block, according to some embodiments. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 710.

At 710, in the illustrated embodiment, graphics unit 150 stores multiple values in one or more hardware storage elements to specify attributes of a data structure in local memory that is accessible to one or more shader processing elements. The local memory space may be dedicated for a particular set of one or more processing elements and not accessible to others. In the illustrated embodiment, the attributes include: A size of the data structure in an X dimension, a size of the data structure in a Y dimension, a number of samples per pixel, and an amount of data per sample. This step may be performed for a pixel kick or a mid-render compute task, for example.

At 720, in the illustrated embodiment, graphics unit 150 accesses the data structure using one or more requests that specify: one or more X coordinates, one or more Y coordinates, one or more samples, and an index into data for ones of the one or more samples. In some embodiments, graphics unit 150 determines a physical address in local memory space based on the request. As discussed above, the access may be made from a mid-render compute task to an LIB declared by a render pass. Similarly, fragment shaders in a render pass may access data in an LIB declared by a mid-render compute task. The following section discusses techniques for synchronizing such accesses, as well as access to other pixel resources.

Exemplary Pixel Resource Synchronization

Some GPU architectures have been configured to perform fragment/pixel operations in a particular order (in the order the operations were submitted to the GPU, which may be referred to as API-submission order). For fragments that do not overlap, the ordering does not matter, because the processing will not affect the other fragments. Therefore, some architectures are configured to generate "pass groups" of fragments, among which the order of operations do not matter (e.g., fragments in a given pass group typically do not overlap in screen space, so the order of operations within the group would not affect each other). These architectures may include hardware to ensure that older pass groups complete before execution of younger pass groups to maintain API submission ordering (also referred to as draw ordering). U.S. Patent Application Publication No. 2016/0055610, for example, discusses techniques for scheduling graphics tasks based on pass group information.

In some embodiments, instead of the GPU implicitly determining the order of pixel operations, operations are not guaranteed to occur in program order unless explicitly specified by the compiler and/or application developer. This may allow the performance of the graphics unit 150 by reducing unneeded stalling while still managing ordering specified by the programmer. It also may allow the graphics unit 150 to consume less power, e.g., because hardware for tracking pass groups may not be needed.

In some embodiments, the graphics unit is configured to execute a pixwait instruction that forces a shader to wait for under-lapping fragments (fragments that cover the same area, but are submitted earlier) to release a resource. Similarly, a "pixrelease" instruction may release a resource to overlapping fragments (fragments that cover the same area but are submitted later). In some embodiments, graphics unit 150 is configured to maintain state information for a set of IDs that are mapped to different pixel resources (e.g., a driver may map IDs to resources). Examples of pixel resources include color attachments (e.g., in color buffers or g-buffers), a depth buffer, a stencil buffer, etc. A depth buffer is typically used to store the z-coordinate for generated pixels. This may allow performance increases by not shading pixels that are behind other pixels. A stencil buffer is another well-known structure that may be used to limit rendering area. In disclosed embodiments, access to these resources may occur out of program order, unless explicitly synchronized using the pixwait and pixrelease instructions, in some embodiments. The pixel resources discusses herein are mentioned for purposes of illustration but are not intended to limit the types of pixel resources that may be synchronized using explicit instructions, in various embodiments.

FIG. 8 includes a block diagram that shows pixlock state 810 for a thread being maintained based on underlapping fragment information. In some embodiments, pixlock state is maintained for each thread. In the illustrated embodiment, stall circuitry 820 is configured to determine whether to stall a thread based on the pixlock state for the thread, a pixwait scope, and one or more pixwait IDs. In some embodiments, the pixwait instruction specifies a mask in which a set bit indicates to wait for the corresponding ID. If the corresponding pixlock bit for the thread is set, in these embodiments, then the stall circuitry 820 does not allow the thread to proceed. The pixrelease instruction may clear the pixlock bit once the corresponding resource has been released, at which point the stall circuitry 820 may allow the thread to proceed.

In some embodiments, the pixwait instruction may also specify a scope, which may affect the granularity of the synchronization. For example, in some embodiments the scope specifies either sample or pixel granularities (note that there may be multiple samples per pixel). In some embodiments, scope may also be specified at the quad granularity (e.g., a 2×2 set of pixels) or at even greater granularities.

FIG. 8 also shows an example mapping 830 of IDs to pixel resources. This mapping may be generated by a graphics driver, for example. Therefore, the mapping between the state bits and the pixel resources may change for different graphics programs. In the illustrated embodiment, IDs 0-3 are assigned to color attachments 0-3 respectively and ID4 is assigned to depth and stencil buffers (in this example a single ID is assigned for both these buffers, to separate IDs may be used in other implementations and/or situations). The exemplary mapping 830 is used for code samples 840 and 850, in the example of FIG. 8.

Example code blocks 840 and 850 perform g-buffer creation and light accumulation, with instructions for synchronization between the two. Consider an exemplary g-buffer that includes four color attachments in a variety of formats (e.g., specifying color accumulation, diffuse albedo, sun-occlusion, normal X/Y, motion vectors, spectral power, spectral intensity, etc). Such a g-buffer may be created for deferred lighting, in a single-pass technique. For g-buffer creation, in the illustrated embodiment, code 840 reads and writes to the stencil and/or depth buffers and writes to color attachments 1-3 in the g-buffer. For light accumulation, in the illustrated embodiment, code 850 reads color attachments 1-3 and writes to color attachment 0.

In code 840, the pixrelease of ID0 may cause a corresponding bit in the pixlock state to change polarity (if previously locked), indicating that color attachment 0 is now available. This release may be included in the code initially because code 840 does not write to color attachment 0. In code 840, the pixwait on ID4 ensures that buffer resources are up to date when accessed (based on outputs from any underlapping fragments). The code then releases ID4 once it has written to the buffer(s). The code then waits for color attachments to be synchronized (if necessary) before storing to color attachments 1-3.

In code 850, the initial release may be performed because this code does not write to color attachments 1-3. The code then waits on the rest of the g-buffer (which will not be released until the "stpix[2][3]" instruction in code 840) before reading the g-buffer, performing light accumulation, and writing to color attachment 0. As shown, a wait or release may specify multiple IDs, e.g., using mask encoding, in some embodiments.

In some embodiments, a GPU is configured to maintain at least two separate identifiers for a given resource. In some embodiments, one ID may be referred to as a READ ID for the resource and the other as a WRITE ID for the resource. In these embodiments, the following approach may be used when modifying a resource:

| | |
|---|---|
| pixwait READ ID \| WRITE ID | // wait for prev. readers and writers |
| modify resource | |
| pixel READ ID \| WRITE ID | // unblock future readers and writers. |

In this example, both IDs were used to wait for and unblock a particular resource. Further, in these embodiments, the following approach may be used to read from a resource without modifying it:

| | |
|---|---|
| pixrel WRITE ID | // don't block anyone waiting for writers |
| pixwait WRITE ID | // wait for previous writers |
| read resource | |
| pixrel READ | // unblock future readers |

Splitting read and write identifiers may allow readers to operate concurrently, by waiting for prior writers to be done (while future writers don't start until the readers are done). Further, reader threads may release the READ ID as soon as data is accessed (e.g. before performing computation on the accessed values).

As discussed above, in the absence of the pixwait and pixrelease instructions, graphics unit 150 is not configured to enforce ordering among the accesses to the pixel resources, in some embodiments. This may allow graphics unit 150 to reduce power consumption by reducing complexity and increase performance by executing out of program order (relative to GPUs that enforce pass-group ordering).

In some embodiments, the disclosed pixel synchronization techniques also facilitate mid-render compute techniques. For example, pixwait and pixrelease instructions may be used to synchronize accesses to resources that are used to share data between a mid-render compute kernel and fragment shader threads. For example, if the mid-render compute task is generating a mipmap in a local image block or a light list, the fragment shaders may need to wait to access the generated data until the mid-render compute task is finished. Note that fragment shaders typically only access data for the fragment they are processing while mid-render compute tasks may look at data corresponding to anywhere in the tile. Therefore, pixel synchronization facilitates ordering in this mixed-granularity context as well (although not limited to mid-render compute). In some embodiments, higher-level granularity may be used for mid-render compute synchronization, e.g., by using a tile scope for the pixwait.

Exemplary Pixel Resource Synchronization Method

Figure 9:
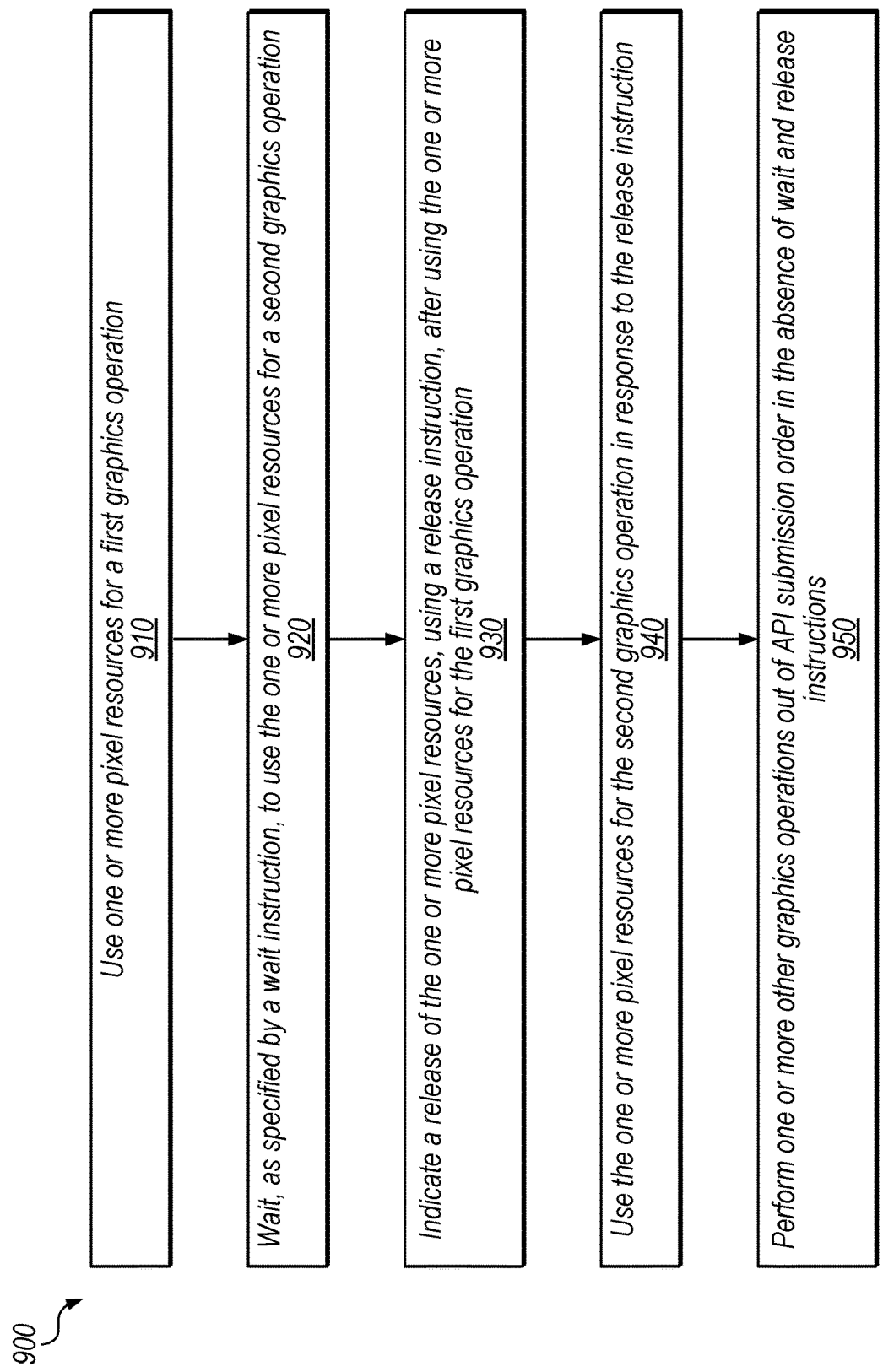
FIG. 9 is a flow diagram illustrating an exemplary method for pixel resource synchronization, according to some embodiments.

FIG. 9 is a flow diagram illustrating one exemplary embodiment of a method 900 for synchronizing access to pixel resources, according to some embodiments. The method shown in FIG. 9 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 910.

At 910, in the illustrated embodiment, graphics unit 150 uses one or more pixel resources for a first graphics operation.

At 920, in the illustrated embodiment, graphics unit 150 waits, as specified by a wait instruction, to use to one or more pixel resources for a second graphics operation. The waiting may be based on one or more identifiers of the pixel resources and a scope specified by the wait instruction. Separate identifiers may be used for each resource to synchronize read-only accesses and modifying accesses differently.

At 930, in the illustrated embodiment, graphics unit 150 indicates a release of the one or more pixel resources using a release instruction (this occurs after using the one or more pixel resources for the first graphics operation). In embodiments with split READ and WRITE identifiers, this may release the resource only for future readers (e.g., using the READ ID) or for both future readers and writers (e.g., using both the READ and WRITE IDs). This method element may include updating a pixlock state register for the thread based on the release.

At 940, in the illustrated embodiment, graphics unit 150 uses the one or more pixel resources for the second graphics operation in response to the release instruction. This may include reading the resource and/or modifying the resource.

At 950, in the illustrated embodiment, graphics unit 150 performs one or more other graphics operations out of API submission order in the absence of wait and release instructions. This may increase performance and reduce power consumption for operations for which ordering is not important.

In some embodiments, a compiler may be configured to generate any of the instructions discussed herein, including instructions for mid-render compute, LIB access, memory consistency, pixel synchronization, etc. The compiler itself may be stored on a non-transitory computer-readable medium. Further, any of the various computer programs discussed herein may be stored on a non-transitory computer-readable medium for execution by one or more processing elements.

Exemplary Device

Referring now to FIG. 10, a block diagram illustrating an exemplary embodiment of a device 1000 is shown. In some embodiments, elements of device 1000 may be included within a system on a chip. In some embodiments, device 1000 may be included in a mobile device, which may be battery-powered. Therefore, power consumption by device 1000 may be an important design consideration. In the illustrated embodiment, device 1000 includes fabric 1010, compute complex 1020 input/output (I/O) bridge 1050, cache/memory controller 1045, graphics unit 1080, and display unit 1065. In some embodiments, device 1000 may include other components (not shown) in addition to and/or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and/or caches. For example, compute complex 1020 may include 1, 2, or 4 processor cores, or any other suitable number. In one embodiment, cache 1030 is a set associative L2 cache. In some embodiments, cores 1035 and/or 1040 may include internal instruction and/or data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions.

Cache/memory controller 1045 may be configured to manage transfer of data between fabric 1010 and one or more caches and/or memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches.

As used herein, the term "coupled to" may indicate one or more connections between elements, and a coupling may include intervening elements. For example, in FIG. 10, graphics unit 150 may be described as "coupled to" a memory through fabric 1010 and cache/memory controller 1045. In contrast, in the illustrated embodiment of FIG. 10, graphics unit 150 is "directly coupled" to fabric 1010 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and/or low-power always-on functionality, for example. I/O bridge 1050 may also include interfaces such as pulse-width modulation (PWM), general-purpose input/output (GPIO), serial peripheral interface (SPI), and/or inter-integrated circuit (I2C), for example. Various types of peripherals and devices may be coupled to device 1000 via I/O bridge 1050.

In some embodiments, various elements of device 1000 may include clock gaters arranged hierarchically, including various series of DET clock gaters coupled to deliver clock signals to different portions of a clock tree. The disclosed techniques may reduce switching power consumption in device 1000, balance the clock delay to different portions of device 1000, reduce errors in device 1000, achieve higher frequency, achieve required frequency at a lower power supply voltage, reduce energy dissipated per cycle (or per task, per pixel, or per byte, for example), etc.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 11 is a block diagram illustrating an exemplary non-transitory computer-readable storage medium that stores circuit design information, according to some embodiments. In the illustrated embodiment semiconductor fabrication system 1120 is configured to process the design information 1115 stored on non-transitory computer-readable medium 1110 and fabricate integrated circuit 1130 based on the design information 1115.

Non-transitory computer-readable medium 1110, may comprise any of various appropriate types of memory devices or storage devices. Medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 1110 may include other types of non-transitory memory as well or combinations thereof. Medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabrication at least a portion of integrated circuit 1130. The format of design information 1115 may be recognized by at least one semiconductor fabrication system 1120. In some embodiments, design information 1115 may also include one or more cell libraries which specify the synthesis and/or layout of integrated circuit 1130. In some embodiments, the design information is specified in whole or in part in the form of a netlist that specifies cell library elements and their connectivity. Design information 1115, taken alone, may or may not include sufficient information for fabrication of a corresponding integrated circuit. For example, design information 1115 may specify the circuit elements to be fabricated but not their physical layout. In this case, design information 1115 may need to be combined with layout information to actually fabricate the specified circuitry.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown in FIGS. 1B, 2, 8, and/or 10. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus comprising:
a plurality of shader processing elements configured to render graphics images using a plurality of resources;
one or more first hardware storage elements configured to store pixel resources operated on by threads executed by ones of the plurality of shader processing elements, wherein one or more of the pixel resources are accessible to multiple ones of the threads; and
one or more state storage elements configured, for ones of the threads executed by the plurality of shader processing elements, to maintain state information that specifies whether each of the pixel resources is locked or available for the thread, including at least one set of state information that indicates a first pixel resource is available to a first thread and a second pixel resource is locked for the first thread;
wherein the plurality of shader processing elements are configured to execute graphics instructions that specify to lock or release the first hardware storage elements for a thread by modifying ones of the one or more state storage elements.

2. The apparatus of claim 1, wherein the pixel resources include: a stencil buffer, a depth buffer, shader side effects in memory, and one or more color attachments.

3. The apparatus of claim 1, wherein the one or more state storage elements are configured to maintain separate read state information and write state information for ones of the pixel resources that specify whether the ones of the pixel resources are locked or available for reading and writing respectively.

4. The apparatus of claim 1, wherein a graphics driver is configured to assign entries in the state storage elements to pixel resources.

5. The apparatus of claim 1, wherein the shader processing elements are configured to execute a wait instruction that specifies to wait to access a resource until one of the state storage elements indicates that the resource is available.

6. The apparatus of claim 5, wherein the shader processing elements are configured to execute a release instruction that sets at least one of the state storage elements to indicate that a resource is available.

7. The apparatus of claim 6, wherein the apparatus is not configured to maintain draw ordering other than ordering specified using the wait and release instructions.

8. A non-transitory computer readable storage medium having stored thereon design information that specifies a design of at least a portion of a hardware integrated circuit in a format recognized by a semiconductor fabrication system that is configured to use the design information to produce the circuit according to the design, including:
a plurality of shader processing elements configured to render graphics images using a plurality of resources;
one or more first hardware storage elements configured to store pixel resources operated on by threads executed by ones of the plurality of shader processing elements, wherein one or more of the pixel resources are accessible to multiple ones of the threads; and
one or more state storage elements configured, for ones of the threads executed by the plurality of shader processing elements, to maintain state information that specifies whether each of the pixel resources is locked or available for the thread, including at least one set of state information that indicates a first pixel resource is available to a first thread and a second pixel resource is locked for the first thread;
wherein the design information specifies that the plurality of shader processing elements are configured to execute graphics instructions that specify to lock or release the first hardware storage elements for a thread by modifying ones of the one or more state storage elements.

9. The non-transitory computer readable storage medium of claim 8, wherein the pixel resources include: a stencil buffer, a depth buffer, and one or more color attachments.

10. The non-transitory computer readable storage medium of claim 9, wherein the state storage elements include entries that are assignable by to each of the stencil buffer, the depth buffer, and ones of the one or more color attachments.

11. The non-transitory computer readable storage medium of claim 8, wherein a graphics driver is configured to assign entries in the state storage elements to pixel resources.

12. The non-transitory computer readable storage medium of claim 8, wherein the shader processing elements are configured to execute a wait instruction that specifies to wait to access a resource until one or the state storage elements indicate that the resource is available.

13. The non-transitory computer readable storage medium of claim 12, wherein the shader processing elements are configured to execute a release instruction that sets at least one of the state storage elements to indicate that a resource is available.

14. The non-transitory computer readable storage medium of claim 13, wherein the circuit is not configured to maintain pass group ordering other than ordering specified using the wait and release instructions.

15. The non-transitory computer readable storage medium of claim 8, wherein the one or more state storage elements are usable by a mid-render compute thread to synchronize access to the pixel resources with one or more render threads.

* * * * *